(No Model.)
J. SOVEREIGN.
TWO WHEELED VEHICLE.
No. 366,798. Patented July 19, 1887.
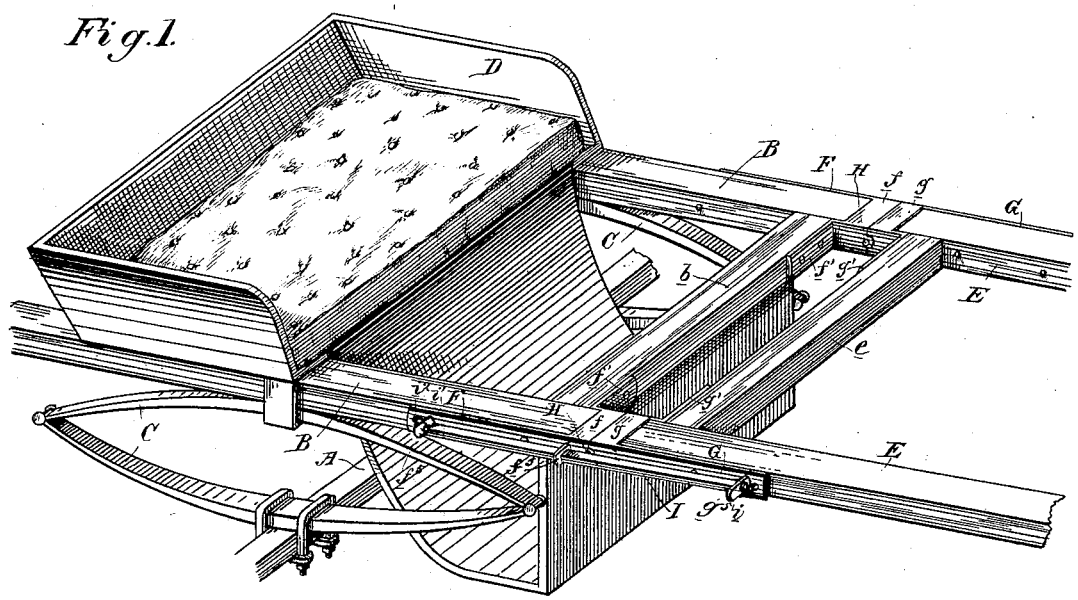
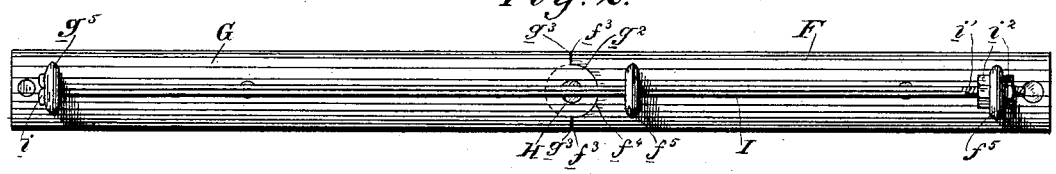
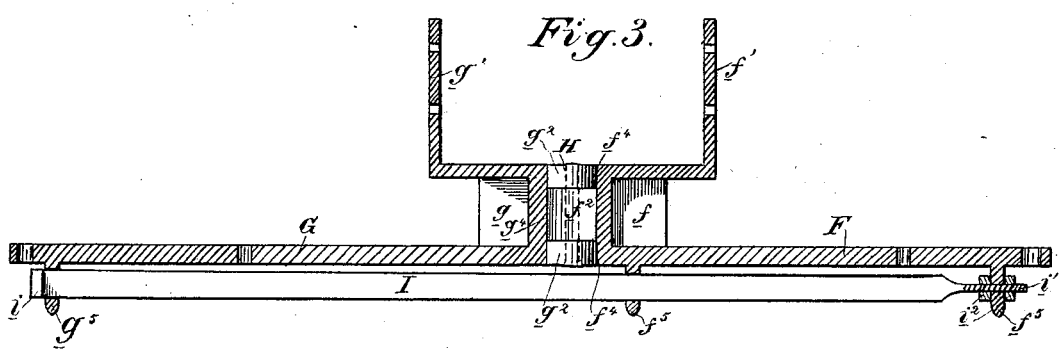
Witnesses,
Geo. H. Strong
Inventor,
J. Sovereign
By Dewey & Co.
Att'ys

United States Patent Office.

JOSHUA SOVEREIGN, OF WOODLAND, CALIFORNIA.

TWO-WHEELED VEHICLE.

SPECIFICATION forming part of Letters Patent No. 366,798, dated July 19, 1887.

Application filed April 7, 1887. Serial No. 234,090. (No model.)

*To all whom it may concern:*

Be it known that I, JOSHUA SOVEREIGN, of Woodland, Yolo county, State of California, have invented an Improvement in Shaft-Couplings for Two-Wheeled Vehicles; and I hereby declare the following to be a full, clear, and exact description of the same.

My invention relates to the class of two-wheeled vehicles commonly known as "carts," and particularly to a new and useful improvement in the shaft-couplings thereof; and my invention consists in the hereinafter-described novel hinged connection between the shafts and the spring-bars forming part of the frame of the vehicle, and the adjustable spring for easing and partially controlling the movement of the hinged joint.

The disadvantages and discomforts of vehicles of this class are well known, and result, principally, from the fact that the body of the vehicle, being mounted upon a single axle, uses said axle as a center about which to oscillate to a greater or less extent, this movement being occasioned by the jogging of the horse, communicated through the shafts, which, of course, must be connected with the vehicle in some manner as to prevent the vehicle from turning backward. In this connection of the shafts lies the great difference between two and four wheeled vehicles, in the latter of which the shafts are simply hinged to the frame of the vehicle. Many constructions have been used in two-wheeled vehicles to overcome this discomfort, one of said constructions being in the line of severing or dividing the shaft, connecting the severed portions by a hinged joint, and limiting and controlling this joint by means of a spring, whereby the shafts may have an independent motion which is not communicated to the body, and the body may have a motion of its own to counteract any tendency to rock and to regulate itself.

It is in this line of construction that my invention lies, and it is my object to provide a simple, practical, and durable coupling for the shafts which will allow them their independence of motion without affecting the body of the vehicle, whereby all rocking motion is avoided and the vehicle made as comfortable as one with four wheels.

Referring to the accompanying drawings for a more complete explanation of my invention, Figure 1 is a perspective view showing the application of my coupling. Fig. 2 is a side elevation of the two straps F and G. Fig. 3 is a horizontal longitudinal section of same.

A is the axle upon which the wheels (not necessary herein to show) are journaled.

B are the spring-bars, forming part of what may be considered as the frame of the vehicle, and having a cross-bar, $b$.

C are the springs, and D is the body or seat of the vehicle, the whole forming and representing any style of cart, my invention being applicable to any form.

E are the shafts, having the usual cross-bar, $e$. The shafts are coupled to the forward ends of the spring-bars by the following connection:

F is a metal strap or iron having on its forward end a socket, $f$, to receive the forward end of the spring-bar B, and a piece, $f'$, turns inwardly from the socket and at right angles. The strap or iron fits against and is bolted or otherwise secured to the side of the spring-bar, while the piece $f'$ fits against and is secured to the forward side of the cross-bar $b$. The forward end of the socket $f$ is formed or provided with a butt, $f^2$, between shoulders $f^3$ above and below, and is flanked by the concave seats $f^4$. On the outer side of the strap are formed or secured guides $f^5$.

G is a strap or iron which fits and is secured to the outer side of the shaft E, and its rear end is formed or provided with a socket, $g$, into which the rear end of the shaft fits, said socket having a piece, $g'$, extending inwardly and secured to the rear side of the cross-bar $e$, which extends between the shafts. The rear end of the socket $g$ is provided with ears $g^2$, having shoulders $g^3$ above and below, and between them a concave seat, $g^4$. The outer surface of the strap G is provided with a slotted guide, $g^5$. When these parts are brought together, the butt $f^2$ of the strap F fits within the concave seat $g^4$ of the socket $g$ of the strap G, and between its ears $g^2$, while said ears fit the concave seats $f^4$ of the socket $f$, and on each side of the butt $f^2$, while the shoulder $f^3$ and $g^3$ of both sockets oppose each other, though without coming close together.

A bolt, H, passing through the ears $g^2$ and the intervening butt, $f^2$, acts as pintle and forms a complete hinge, having a limited but sufficient motion or play by reason of the opposing shoulders of the two sockets.

Within the slotted guides $f^5$ and $g^5$ of the two straps is fitted a flat spring, I, which is here shown as composed of two leaves, one end of the spring having a stop, $i$, engaging the guide of the strap G, while the other end has a threaded spindle, $i'$, upon which are fitted nuts $i^2$, which hold the spring to its place and permit its adjustment, thereby regulating its strength and controlling the movement of the hinge-joint.

It will be seen that the spring is on the side of the shaft, instead of being, as is usual in this class of devices, either on the top or on the bottom.

The operation of the coupling is as follows: The up-and-down motion which the shafts receive from the jogging of the horse is confined entirely to said shafts, and is not communicated to the spring-bars, because of the yielding of the hinged joint, which, though limited in its character, is sufficient for all purposes. This movement of the hinged joint is eased and controlled to a sufficient extent by the adjustable spring on the side. It will thus be seen that the shafts and body have independent motions, so that the latter may counteract any tendency to rocking, and the vehicle is thereby rendered desirable as a mode of conveyance.

Having thus described my invention, what I claim as new, and desire to secure by Letters Patent, is—

1. A shaft-coupling for two-wheeled vehicles, consisting of straps or irons secured, respectively, to the frame of the vehicle and to the shafts, and having a hinge-connection between them, and a spring seated in guides on the side of the straps or irons and crossing the line of the hinge-joint, substantially as herein described.

2. A shaft-coupling for two-wheeled vehicles, consisting of straps or irons secured, respectively, to the frame of the vehicle and to the shafts, and having a hinge-connection between them, and a spring seated in guides on the side of the straps or irons and crossing the line of the hinge-joint, said spring having a threaded end and nuts whereby it may be adjusted to regulate the movement of the hinge-joint, substantially as herein described.

3. A shaft-coupling for two-wheeled vehicles, consisting of straps or irons secured, respectively, to bars forming part or extensions of the frame of the vehicle and to the shafts, and having end sockets for the reception of said bars and shafts, a hinged connection between the meeting ends of the said straps or irons, and a spring seated in guides on the side of said straps and crossing the line of the hinge-joint, substantially as herein described.

4. A shaft-coupling for two-wheeled vehicles, consisting of straps or irons secured, respectively, to bars forming part or extensions of the frame of the vehicle and to the shafts, and having end sockets for the reception of said bars and shafts, a hinged connection between the meeting ends of said straps or irons, shoulders for limiting the motion of said hinge, and a spring seated in guides on the side of said straps or irons and crossing the line of the hinge-joint for easing its motion, substantially as herein described.

5. In a shaft-coupling for two-wheeled vehicles, the straps F and G, fitting the spring-bars of the frame and shafts, respectively, and having end sockets for their reception, a hinged connection between the meeting ends of said straps, and the spring seated in the guides on the sides of said straps, and having a screw-spindle and nuts whereby it may be adjusted for tightening up or loosening the hinge-joint, substantially as herein described.

6. A shaft-coupling for two-wheeled vehicles, consisting of the straps F, secured to the side of the spring-bars of the vehicle, and having end sockets for their reception, and pieces secured to the cross-bar between the spring-bars, the straps G, secured to the side of the shafts and having end sockets for their reception, and pieces secured to the cross-bar of the shafts, and a limited hinged joint or connection between the meeting ends of the two straps, substantially as herein described.

7. A shaft-coupling for two-wheeled vehicles, consisting of the straps F and G, having the end sockets, $f$ and $g$, and pieces $f'$ and $g'$, and a limited hinged connection between said straps, and the adjustable flat springs seated in the guides on the side of said straps, and having screw-spindles and nuts for adjusting them, all arranged and adapted to operate substantially as herein described.

In witness whereof I have hereunto set my hand.

JOSHUA SOVEREIGN.

Witnesses:
W. J. PRYOR,
JOS. F. KINGSLY.